Patented Dec. 31, 1929

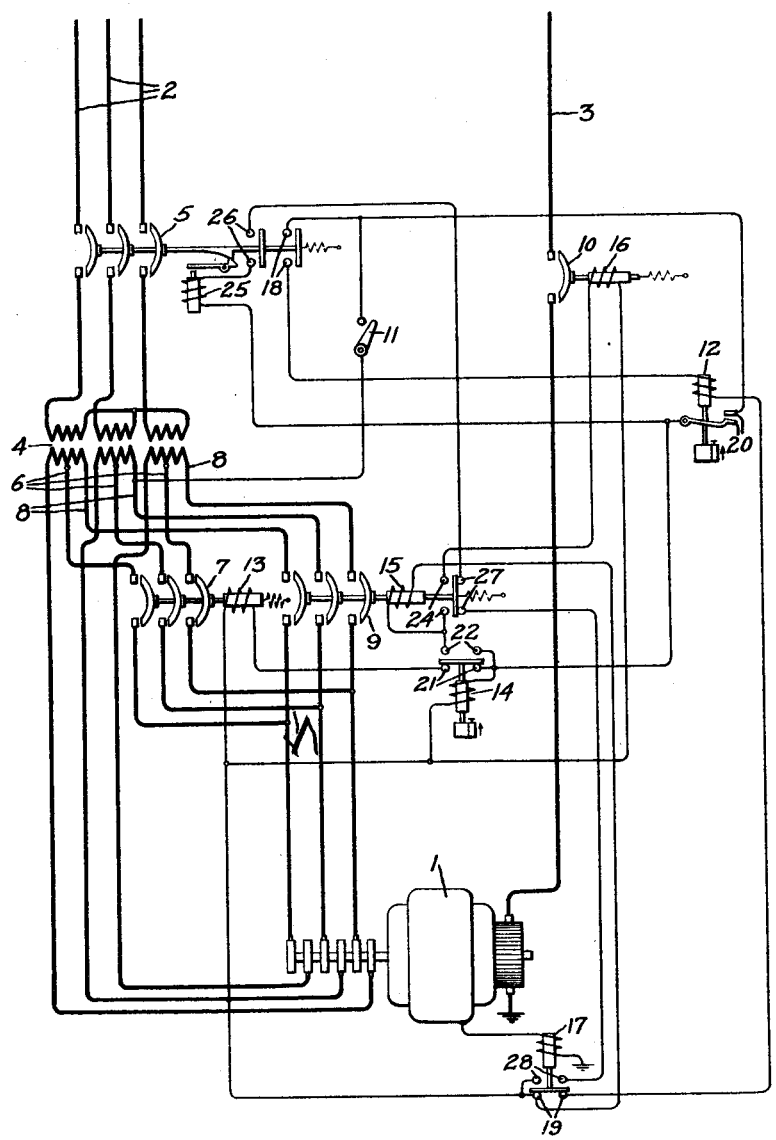

1,742,151

UNITED STATES PATENT OFFICE

HAROLD T. SEELEY, OF LANSDOWNE, PENNSYLVANIA, ASSIGNOR TO GENERAL ELECTRIC COMPANY, A CORPORATION OF NEW YORK

AUTOMATIC CONTROL SYSTEM

Application filed August 6, 1928. Serial No. 297,816.

My invention relates to automatic control systems for dynamo electric machines and its object is to provide an improved control arrangement for a dynamo electric machine whereby a flash-over to the frame of the machine while it is supplying current to a load circuit effects the shutting down of the machine and the subsequent automatic reconnection thereof to the load circuit whereas a fault within the machine between the winding and frame thereof effects the shutting down of the machine and prevents a subsequent reconnection thereof to the load circuit.

In automatic stations employing direct current machines it is customary to provide a manually reset grounding relay which is connected between the frame of the machine and the ground so that the relay is energized whenever the machine flashes over to the frame. This grounding relay heretofore has been arranged so that whenever it operated it effected the shutting down of the station and prevented further automatic operation of the station until the relay had been reset. In accordance with my invention I employ a relay between the frame of the machine and ground which automatically resets itself when deenergized. I connect this relay so that it effects the shutting down of the station and subsequent restarting thereof when a flash-over occurs and the shutting down of the station and the locking out thereof against a restart when the relay is energized due to a fault within the machine such for example as a grounded winding.

My invention will be better understood from the following description taken in connection with the accompanying drawing and its scope will be pointed out in the appended claims.

Referring to the accompanying drawing which diagrammatically shows an automatic control system for a rotary converter embodying my invention, 1 represents a rotary converter which is adapted to be connected between an alternating current supply circuit 2 and a direct current load circuit 3 one side of which is connected to ground. 4 represents a poly-phase transformer the primary winding of which is arranged to be connected to the supply circuit 2 by means of a non-automatic closing circuit breaker 5. The secondary winding of the transformer 4 is provided with the low voltage taps 6 which are adapted to be connected to the amature winding of the rotary converter 1 by means of a suitable switch 7 so that a relatively low alternating current voltage may be impressed upon the armature winding of the converter for starting purposes. The secondary winding of the transformer 4 is also provided with high voltage taps 8 which are adapted to be connected to the armature winding of the converter 1 by means of a switch 9 so that a relatively high voltage may be impressed upon the armature winding for running purposes.

The rotary converter 1 is adapted to be connected to the load circuit 3 by means of a switch 10 which may be of any suitable construction examples of which are well known in the art.

As shown in the drawing the starting of the converter 1 is effected by the closing of a suitable control switch 11 which may be controlled in any suitable manner examples of which are well known in the art. The switch 11 when closed is arranged, when the circuit breaker 5 is closed, to complete a circuit for a master control relay 12. The energization of the master relay 12 effects the successive closing of the starting switch 7, the running switch 9 and the load switch 10. Any suitable control arrangement examples of which are well known in the art may be provided for effecting the operation of the switches 7, 9 and 10 in the desired sequence and at the proper time. In the particular arrangement shown in the drawing the energization of the control relay 12 completes a circuit for the closing coil 13 of the starting switch 7. The energization of the control relay 12 also completes the circuit of a time relay 14 which after a predetermined time effects the opening of the switch 7 and the completion of a circuit for the closing coil 15 of the switch 9. The closing of the switch 9 completes a circuit for the closing coil 16 of the load switch 10 so as to connect the converter to the load circuit. In practice the circuits of the closing coils may be controlled by other suitable devices in a manner well known in the art so that the proper operation thereof is affected at all times. Since these devices are well known and constitute no essential part of my present invention I have omitted them from the disclosure in order to simplify it.

For controlling the operation of the converter when a flash-over occurs or one of the windings of the converter becomes grounded, I provide a relay 17 which is connected between the frame of the machine 1 and the ground which constitutes one side of the load circuit. The relay 17 is provided with contacts 19 which are normally in the circuit of the master control relay 12. Whenever the relay 17 becomes energized it opens the circuit of the master control relay 12 and effects the shutting down of the converter 1. If the operation of the relay 17 is due to a flash-over between the positive brush of the converter and the frame which is very unlikely to occur except when the switches 9 and 10 are closed and the converter is supplying current to the load circuit, the operation of the relay 17 merely effects the shutting down of the equipment and the automatic restarting thereof. If, however, the operation of the relay 17 occurs while the starting connections are established, this is an indication that one of the windings of the converter is grounded and that the station should be locked out against further automatic operation until the faulty machine has been repaired. In accordance with my invention the relay 17 is arranged to effect the opening of the non-automatic closing circuit breaker 5 whenever the relay 17 is operated while the running switch 9 is open. Therefore, I have provided an arrangement which effects the shutting down of the station whenever the relay 17 is energized and allows the station to be automatically restarted only when the operation of the relay 17 is due to a flash-over between the positive brush and the frame of the machine.

The operation of the arrangement shown in the drawing is as follows:

When it is desired to place the converter 1 into operation and circuit breaker 5 is closed in any suitable manner and then the control switch 11 is closed. The closing of the control switch 11 completes a circuit for the master control relay 12 from one side of a suitable source of control current through the control switch 11, auxiliary contacts 18 on the circuit breaker 5, coil of the relay 12, contacts 19 of relay 17 to the other side of the source of control current. Relay 12 closes its contacts and completes a circuit for the closing coil 13 of the starting switch 7 so that the starting connections of the converter are established. The circuit of the closing coil 13 is from one side of the control circuit through the control switch 11, contacts 20 of relay 12, contacts 21 of the timing relay 14, closing coil 13 of the switch 7 to the other side of the control circuit. The closing of the contacts 20 of the control relay 12 also completes a circuit for the time relay 14, the coil of which is connected in parallel with the closing coil 13 and the contacts 21 of the relay 14. After a predetermined time interval the relay 14 opens its contacts 21 in the circuit of the closing coil 13 of the starting switch 7 and closes its contacts 22 in the circuit of the closing coil 15 of the running switch 9. The circuit of the closing coil 15 is from one side of the control circuit through the control switch 11, contacts 20 of relay 12, contacts 22 of relay 14, closing coil 15 to the other side of the control circuit. The deenergization of the closing coil 13 opens the starting switch 7 and the energization of the closing coil 15 closes the switch 9 so that the running connections of the converter are established. The closing of the auxiliary contacts 24 on switch 9 completes through contacts 22 of the relay 14 a circuit for the closing coil 16 of the switch 10 so that the converter is connected to the load circuit 3.

If a flash-over or grounded winding should occur while the converter 1 is supplying current to the load circuit, relay 17 becomes energized and by opening its contacts 19 opens the circuit of the control relay 12. This relay 12 by opening its contacts 20 deenergizes the closing coils 15 and 16 of the switches 9 and 10 so that the converter is disconnected from the supply and load circuits and the converter shuts down. When the relay 17 recloses its contacts 19, the circuit of the master control relay 12 is again completed and the converter is reconnected to the load circuit in the same manner as above described, if the operation of the relay 17 is due to a flash-over as the flash-over will not appear again until the machine is re-connected to the load circuit.

If however the operation of the relay 17 is due to one of the windings of the converter being grounded to the frame, relay 17 becomes energized again when the starting connections of the converter are being reestablished. When the relay 17 operates under these conditions, it effects the deenergization of the master control relay 12 in the same manner as before so that the converter is disconnected from the supply circuit. The relay 17, however, is also arranged under these conditions to complete a circuit for the trip coil 25 of the circuit breaker 5. This circuit is from one side of the control circuit through control switch 11, contacts 20 of relay 12, trip coil 25 of the circuit breaker 5, auxiliary contacts 26 on the circuit breaker 5, auxiliary contacts 27 on the running switch 9, contacts 28 of the relay 17 to the other side of the control circuit. The energization of the trip coil 25 effects the opening of the circuit breaker 5 so that the transformer 4 is disconnected from the supply circuit. Since the circuit breaker 5 is of the non-automatic closing type, further automatic operation of the control apparatus is prevented until the switch 5 has been reclosed manually.

While I have in accordance with the patent statutes shown and described my invention as applied to a particular system and as embodying various devices diagrammatically indicated, changes and modifications will be obvious to those skilled in the art and I therefore aim in the appended claims to cover all such changes and modifications as fall within the true spirit and scope of my invention.

What I claim as new and desire to secure by Letters Patent of the United States, is:

1. In combination, a dynamo electric machine, a load circuit, an electroresponsive device connected between the frame of said machine and one side of said circuit so that current flows through said device only under predetermined abnormal conditions of said machine, and means controlled by said device for effecting a predetermined operation of said machine when the current through said device exceeds a predetermined value under predetermined conditions of said machine and for effecting a different predetermined operation of said machine when the current through said device exceeds a predetermined value under other predetermined conditions of said machine.

2. In combination, a dynamo electric machine, a load circuit, a relay connected between the frame of said machine and ground, means controlled by said relay for effecting the shutting down of said machine and the automatic restarting thereof when the current through said relay exceeds a predetermined value under predetermined conditions of said machine and for effecting the shutting down of said machine and for preventing an automatic restart thereof when the current through said relay exceeds a predetermined value under other predetermined conditions of said machine.

3. In combination, a supply circuit, a load circuit, a rotary transformer connected between said circuits, electroresponsive means connected between the frame of said machine and one side of said load circuit, and means controlled by said electroresponsive means for effecting the shutting down of said transformer and an automatic restart thereof and a reconnection thereof to the load circuit when the operation of said electroresponsive means is effected by a fault on said load circuit and for effecting the shutting down said transformer and locking it out against a reconnection to the load circuit when the operation of said electroresponsive means is effected by a fault in said transformer.

4. In combination, a supply circuit, a dynamo electric machine, means for establishing starting connections between said circuit and machine, means for establishing running connections between said circuit and machine, a relay connected between the frame of said machine and ground, and means controlled by said relay for shutting down said machine and subsequently establishing said starting connections when a flash-over occurs while the running connections are established and for shutting down the machine and for preventing the subsequent establishment of the starting connection when the current through said relay exceeds a predetermined amount while the starting connections are established.

5. In combination, a dynamo electric machine, a load circuit, a relay connected between the frame of the machine and one side of the load circuit, means for effecting the starting of said machine, means controlled by said starting means for effecting the connection of said machine to said load circuit after the machine has been started, and means controlled by said relay for shutting down said machine and effecting the operation of said starting means when said relay is energized a predetermined amount while said machine is supplying current to said load circuit and for shutting down said machine and locking it out against a restart when said relay is energized a predetermined amount while said machine is being started.

6. In combination, a supply circuit, a rotary transformer, means for connecting said transformer to said circuit so that a relatively low voltage is impressed on said transformer, means for connecting said transformer to said circuit so that a relatively high voltage is impressed on said transformer, a load circuit, a relay connected between the frame of said transformer and ground, and means controlled by said relay for shutting down said transformer and subsequently effecting the operation of said relatively low voltage connecting means when the current through said relay exceeds a predetermined value while the relatively high voltage is being impressed on said transformer and for shutting down said transformer and preventing the subsequent operation of said relatively low voltage connecting means when the current through said relay exceeds a predetermined value while said machine is connected to said source so that a relatively low voltage is impressed thereon.

7. In combination, a supply circuit, a transformer having high and low voltage secondary connections, a non-automatic reclosing circuit breaker for connecting the primary of said transformer to said circuit, a rotary transformer, a switch for connecting the rotary transformer to the low voltage secondary connection of said transformer, a switch for connecting the rotary transformer to the high voltage connection of said transformer, a load circuit having one side thereof grounded, means for connecting said rotary transformer to said load circuit, a relay connected between the frame of said rotary transformer and ground, and means controlled by said relay for opening the switch between high voltage connection of the transformer and the rotary transformer and for subsequently closing the switch between the low voltage connection of the transformer and the rotary transformer when the current through said relay exceeds a predetermined value while the switch between the high voltage connection of the transformer and the rotary transformer is closed and for opening the switch between the low voltage connection of the transformer and the rotary transformer and the circuit breaker in the primary circuit of the transformer when the current through the relay exceeds a predetermined value while the low voltage switch is closed.

8. In combination, an alternating current supply circuit, a non-automatic closing circuit breaker in said circuit, a direct current load circuit having one side thereof connected to ground, a rotary converter, means for connecting the winding of said converter to said circuit so that a relatively low alternating current voltage is impressed on said winding, means for connecting the winding of said converter to said circuit so that a relatively high alternating current voltage is impressed on said winding, means for connecting the winding of said converter to said load circuit, a relay connected between the frame of said converter and ground, and means controlled by said relay for effecting the disconnection of said converter winding from said load circuit and the supply circuit and the subsequent operation of said relatively low voltage connecting means when the current through said relay exceeds a predetermined value while said converter winding is connected so that a relatively high alternating current voltage is impressed thereon and for effecting the disconnection of said winding from said supply circuit and the opening of said non-automatic closing circuit breaker when the current through said relay exceeds a predetermined amount while said supply circuit is connected to said winding so that a relatively low voltage is impressed thereon.

In witness whereof, I have hereunto set my hand this 3rd day of August, 1928.

HAROLD T. SEELEY.